UNITED STATES PATENT OFFICE.

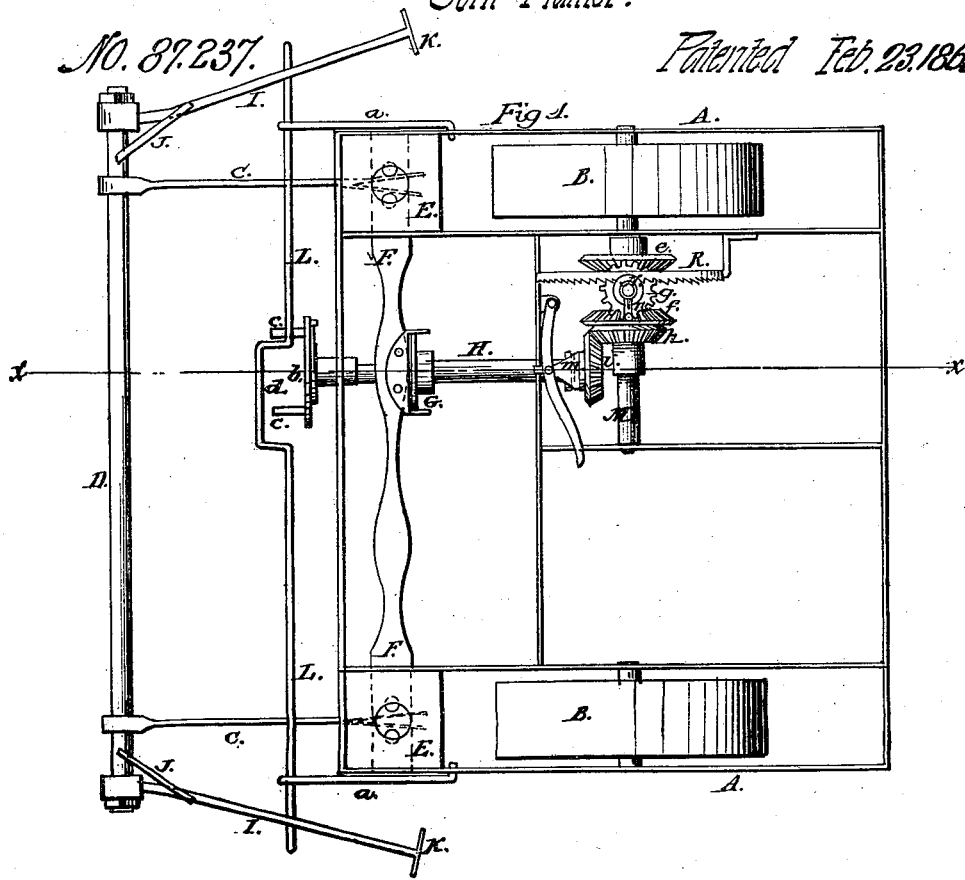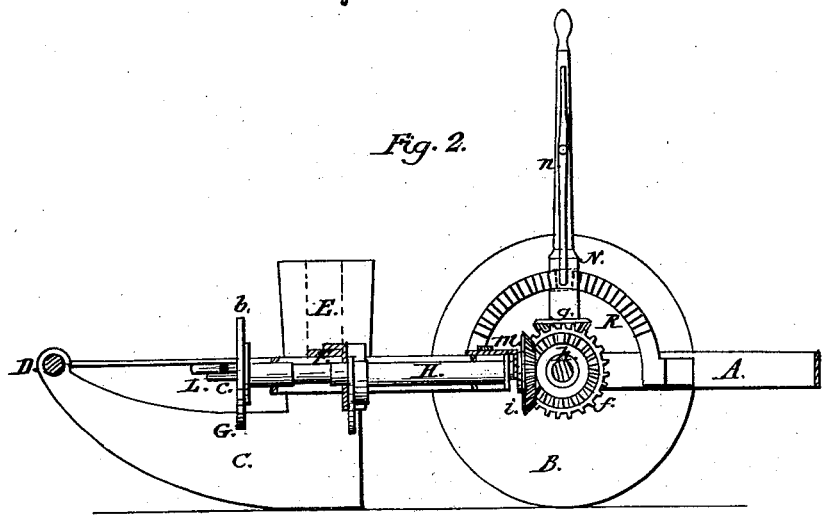

WILLIAM T. BEEKMAN, OF PETERSBURG, ILLINOIS.

IMPROVEMENT IN CORN-PLANTERS.

Specification forming part of Letters Patent No. 87,237, dated February 23, 1869.

*To all whom it may concern:*

Be it known that I, WILLIAM T. BEEKMAN, of Petersburg, in the county of Menard and State of Illinois, have invented certain new and useful Improvements in Machines for Planting Corn; and I do hereby declare that the following is a full, clear, and exact description of the same, reference being had to the accompanying drawings, making a portion of this specification, in which—

Figure 1 is a plan view of a corn-planting machine made according to my invention. Fig. 2 is a vertical longitudinal section of the same, taken in the line $x\ x$ of Fig. 1.

Similar letters of reference indicate corresponding parts in both figures.

The object of this invention is to provide a corn-planting apparatus by the use of which the corn may be planted in straight and uniform rows each way without the common preliminary operation of marking out the ground, and also to enable the machine to be operated by a single attendant instead of two, as is ordinarily required with this class of planters.

The invention consists in the combination of vibrating marking-spades with the seed-dropping devices of the machine in such manner that the marks made in the ground by the action of the spades may serve as indices by which any variation in the dropping of the seed may be effectually guarded against, the straightness of the rows transverse to the path of the machine being by this means secured.

The invention further consists in a novel combination of parts whereby the requisite vibrating movement is automatically communicated to the marking-spades; also, in a novel combination of parts by which such movement of the spades may be modified or controlled by hand, when required, in order to obviate any irregularity which might otherwise be incurred in the straightness of the rows from inequalities in the surface of the ground; also, in a novel arrangement of parts whereby the slides of the seed-dropping devices may be actuated from the same shaft that gives their vibrating motion to the marking-spades.

To enable others to understand the construction and operation of my invention, I will proceed to describe it with reference to the drawings.

A is the horizontal main frame of the machine, supported for the most part by the broad-faced wheels B, and furnished at its forward end with runners C. The front extremities of these runners are connected by a transverse rod, D, and each at its rear extremity is split or forked, as indicated in dotted outline in Fig. 1, and constitutes, as it were, a share, which opens the furrow for the reception of the seed. Above this forked or share portion of each runner is situated a seed-hopper, E, so that in the planting operation the seed may fall through the interior of such portion of the runner into the furrow.

The seed-slides, by which the seed is dropped at intervals from the hoppers, are shown at F, and receive their reciprocating movement from the rotation of a cam, G, on a longitudinal shaft, H, arranged on the forward portion of the frame A. It should be mentioned that after the seed is thus deposited in the furrows it is properly covered by the passage over the furrows of the broad-faced wheels of the machine.

Pivoted to or swinging upon the laterally-projecting ends of the rod D are bars I, pressed downward by springs J, and furnished at their rear extremities with spades K, the lower or cutting parts of which are of triangular or half-diamond form, these spades being so arranged that when depressed they will be in line with the rear portions of the furrowing-runners C, through which the seed passes to the ground, as hereinbefore explained. The means by which a vibrating or rising-and-falling movement is communicated to these spades may be set forth as follows: A transverse rod, L, is arranged at the front of the frame A and attached to the sides of the latter by arms $a$ in such manner as to be capable of swinging up and down. The ends of this rod L, furthermore, extend underneath the bars I of the spades K, as is shown more clearly in Fig. 1. A disk, $b$, on the forward end of the shaft H, is furnished with pins or studs $c$. As the disk revolves, the upward movement of one of these pins against the adjacent portion of the rod L lifts the rod, and consequently the bars I and their spades K, until the pin passes into a recess, $d$, formed by bending the rod, as represented in Fig. 1, whereupon, the rod being released from the action of the pin, the spades are forced sharply down by the action of the springs J, and are thus caused to indent the soil until again raised by the upward movement of the other pin on the disk. Simultaneous with this marking or indentation of the ground is the dropping of the seed by the movement of the slides worked from the same shaft that, as just described, gives motion to the marking-spades. Inasmuch as the marks made by the spades are always in line with the points at which the seed is dropped, it follows that as the machine is drawn along a comparison of the position of the marks made by the spades with those made by the same means in the planting of the previous rows will afford an index to the straightness of the rows and allow any deviation to be modified by agencies presently herein explained.

The axle-shaft M of one of the wheels B extends inward, and has firmly secured thereon a bevel-gear, $e$. Placed opposite this bevel-gear is another, $f$, of like character placed loose on the axle-shaft M. Gearing into and arranged between the two gears just mentioned is a third one, $g$, which rotates around a lever, N, pivoted to the axle-shaft M. The gear $f$ has a similar bevel-gear, $h$, provided upon its back and gearing into another bevel-gear, $i$, upon the end of the shaft H. This gear $i$ has fitted thereto a clutch and lever at $m$, by which, when desired, it may be thrown out of contact with the gear $h$. The lever N has a supplemental lever, $n$, pivoted thereto. This supplemental lever is furnished at its lower end with a tooth, which passes through a slot provided in the lever N, and works against a ratchet formed upon the inner side of an arc, R, arranged in a vertical plane at the adjacent side of the frame A, the design of this arrangement of the tooth and ratchet being to hold the gears $f$ $h$ on the axle-shaft in proper relation with the gear $e$ of such shaft.

The parts being properly adjusted, the rotation of the axle-shaft derived from the wheel attached thereto operates through the series of gears above described to rotate the shaft H, and consequently to work the seed-slides and the marking-spades. In case, from any unevenness or inequalities in the surface of the ground, the marking-spades are found to descend out of line with the row indicated by the marks made during the previous passage of the machine, the supplemental lever is pressed toward the other lever, N, so as to bring the tooth of the former lever away from the ratchet-surface of the arc, whereupon, by pushing forward or bringing back the lever N, as the case may be, to change the positions of the gears $f$ $h$ with regard to that of the gear, by which means the pins $c$ upon the disk $b$ are brought in such relation with the rod L that the action of such pins upon the rod will insure the rising and falling of the spades exactly at the proper time, so that great straightness and uniformity of the rows may be secured both in the direction of the path of the machine and transversely thereto, the machine being furthermore rendered capable of easy and efficient manipulation by a single person, and by the accuracy with which the seed is dropped both ways, dispensing with the necessity of furrowing or marking out the ground previous to planting, as is ordinarily required.

What I claim as my invention, and desire to secure by Letters Patent, is—

1. So combining and operating the vibrating marking-spades K with the seed-dropping mechanism of a corn-planting machine that the marks made by the spades shall serve as indices by which any undue deviation in the dropping of the seed in straight rows may be ascertained, substantially as herein set forth.

2. The combination of the rod L, the disk $b$, having pins $c$, and the bars carrying the marking-spades K, substantially as and for the purpose herein set forth.

3. The arrangement in relation with each other of the lever N, carrying the toothed supplemental lever $n$ and gear $g$, the arc R, formed with a ratchet-surface, the gears $e$ $f$ $h$ on the axle-shaft, and the gear $i$ on the shaft H, all substantially in the manner and for the purpose herein set forth.

4. The combination of the shaft H, eccentric G, and disk $b$, having pins $c$, with the rod L, marking-spades K, and the slides F of the seed-hoppers E, substantially as herein set forth.

WILLIAM T. BEEKMAN.

Witnesses:
J. W. COOMBS,
FRED. HAYNES.